(12) United States Patent
Yamamichi

(10) Patent No.: US 9,099,022 B2
(45) Date of Patent: Aug. 4, 2015

(54) INFORMATION PROCESSING APPARATUS, SCREEN DISPLAY METHOD, AND NON-TRANSITORY COMPUTER-READABLE MEDIUM

(71) Applicant: CANON KABUSHIKI KAISHA, Tokyo (JP)

(72) Inventor: Masaki Yamamichi, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 169 days.

(21) Appl. No.: 13/919,044

(22) Filed: Jun. 17, 2013

(65) Prior Publication Data
US 2014/0002328 A1    Jan. 2, 2014

(30) Foreign Application Priority Data
Jun. 29, 2012   (JP) .................................. 2012-147597

(51) Int. Cl.
*G09G 5/00* (2006.01)
*G06F 3/14* (2006.01)
*G09G 5/14* (2006.01)
*G06F 9/44* (2006.01)

(52) U.S. Cl.
CPC ........ *G09G 5/003* (2013.01); *G06F 3/14* (2013.01); *G06F 3/1423* (2013.01); *G06F 9/4445* (2013.01); *G09G 5/14* (2013.01); *G09G 2340/0407* (2013.01); *G09G 2340/14* (2013.01)

(58) Field of Classification Search
None
See application file for complete search history.

(56) References Cited

U.S. PATENT DOCUMENTS

| 2004/0226041 | A1* | 11/2004 | Smith et al. ...................... 725/43 |
| 2010/0066698 | A1* | 3/2010 | Seo ............................... 345/173 |
| 2010/0318770 | A1* | 12/2010 | Lin et al. ........................ 712/220 |
| 2012/0084798 | A1* | 4/2012 | Reeves et al. .................. 719/319 |
| 2012/0287042 | A1* | 11/2012 | Chen .............................. 345/157 |
| 2013/0024778 | A1* | 1/2013 | Reeves et al. .................. 715/744 |
| 2013/0293573 | A1* | 11/2013 | Wolfe et al. .................... 345/629 |

FOREIGN PATENT DOCUMENTS

JP      2004-086586 A     3/2004

* cited by examiner

*Primary Examiner* — Jason Olson
(74) *Attorney, Agent, or Firm* — Rossi, Kimms & McDowell LLP

(57) ABSTRACT

An apparatus, which comprises an OS having a first and second execution environment, and executes a first application which runs on the first execution environment, and a second application which runs on the second execution environment, the apparatus comprises: a unit which receives, when a screen of a first display style on a screen corresponding to the first execution environment is displayed on a display, a running instruction of the second application to be displayed in a second display style; a unit which determines whether the apparatus comprises a plurality of displays; and a unit which displays, when the apparatus comprises the plurality of displays, without changing a display style of a screen displayed on a display in the first display style, a screen of the second application on another display in the second display style.

9 Claims, 11 Drawing Sheets

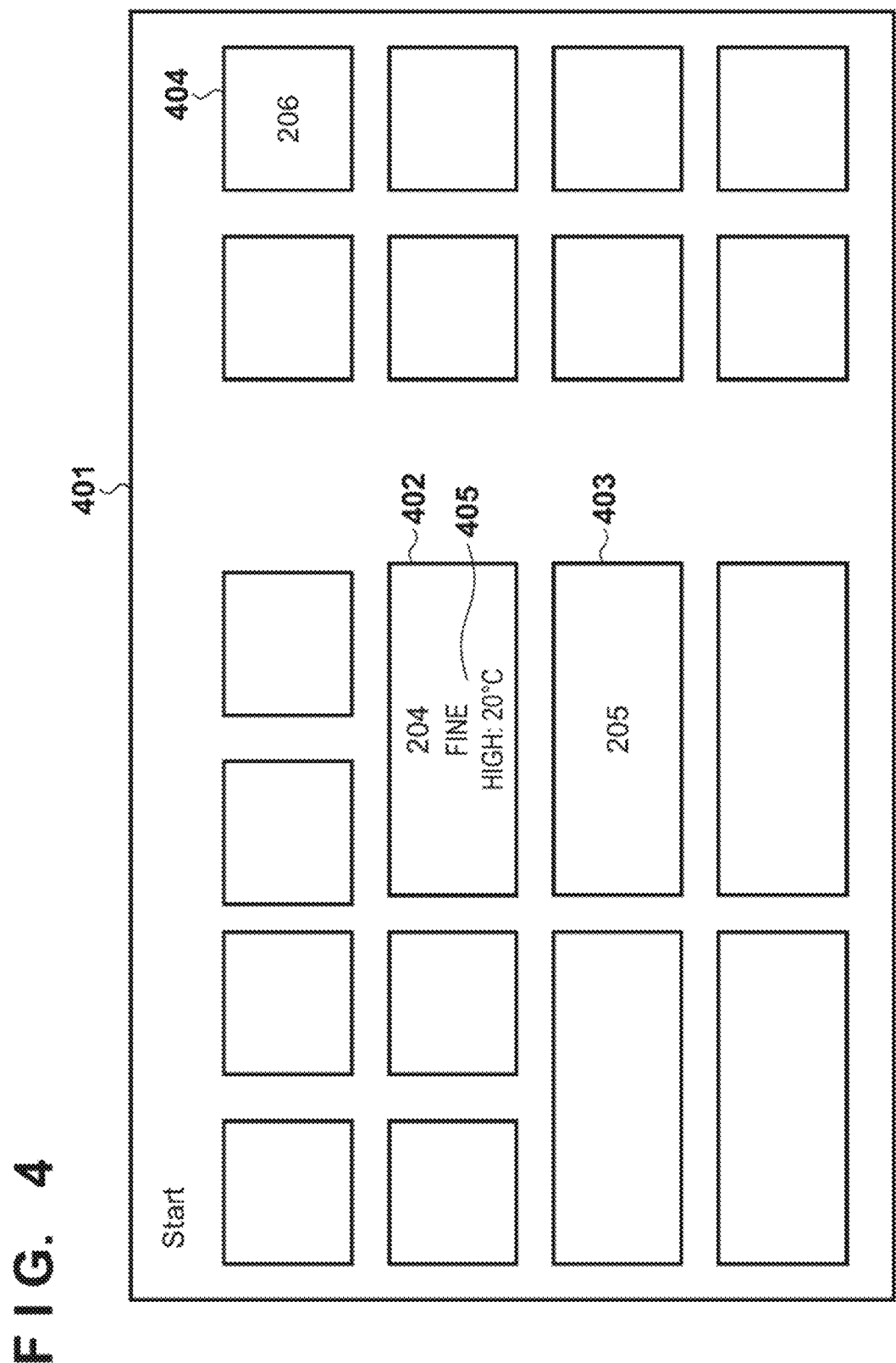

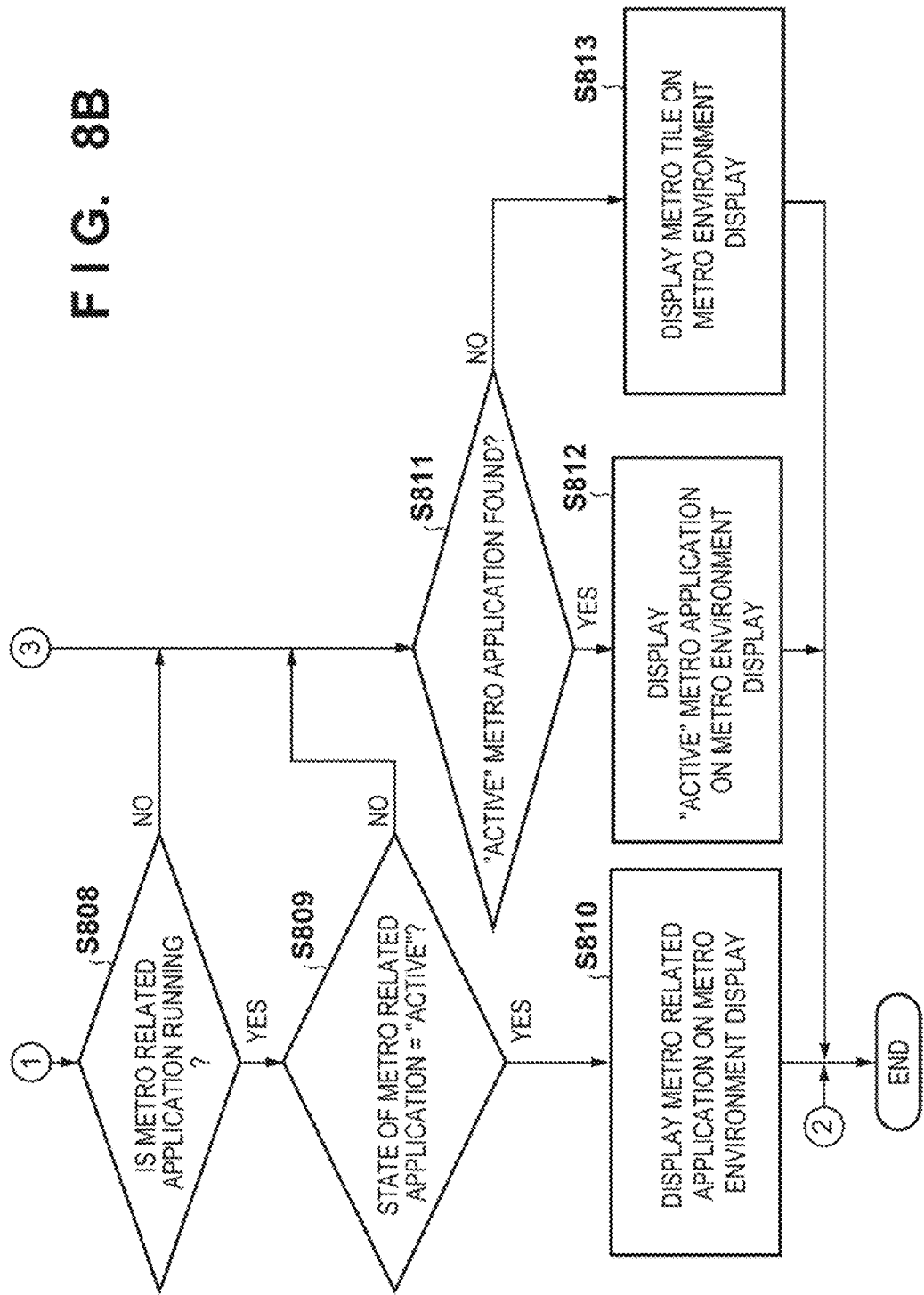

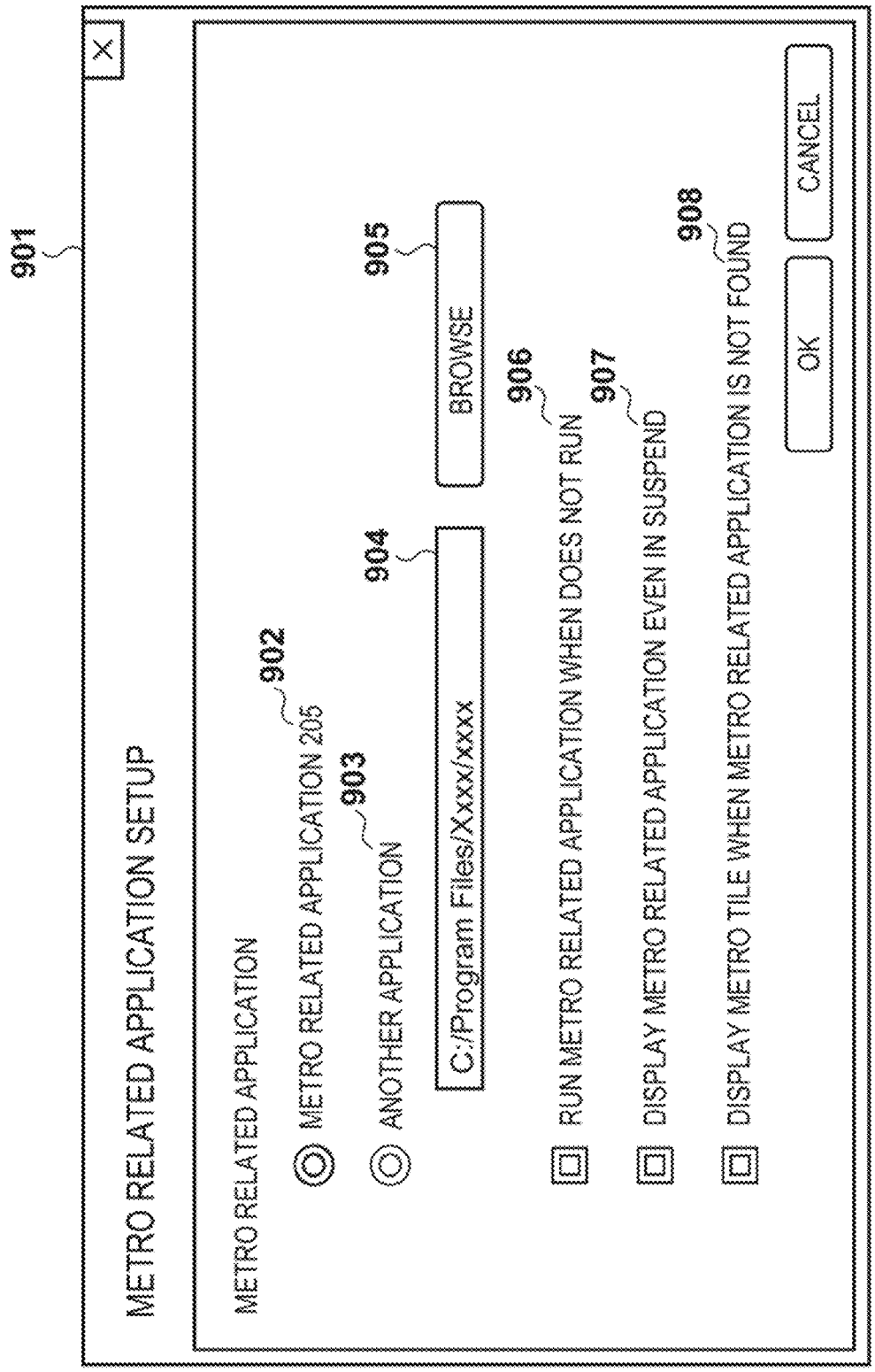

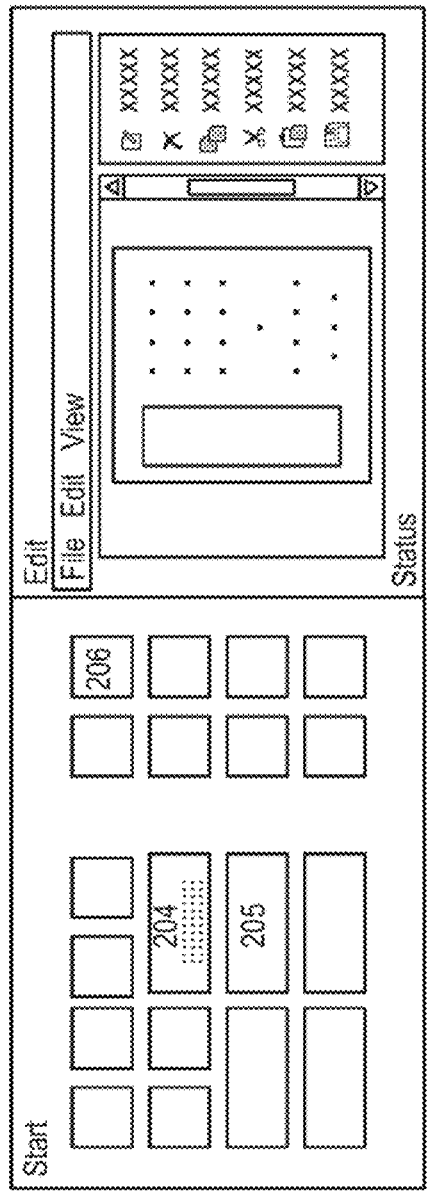
F I G. 10E
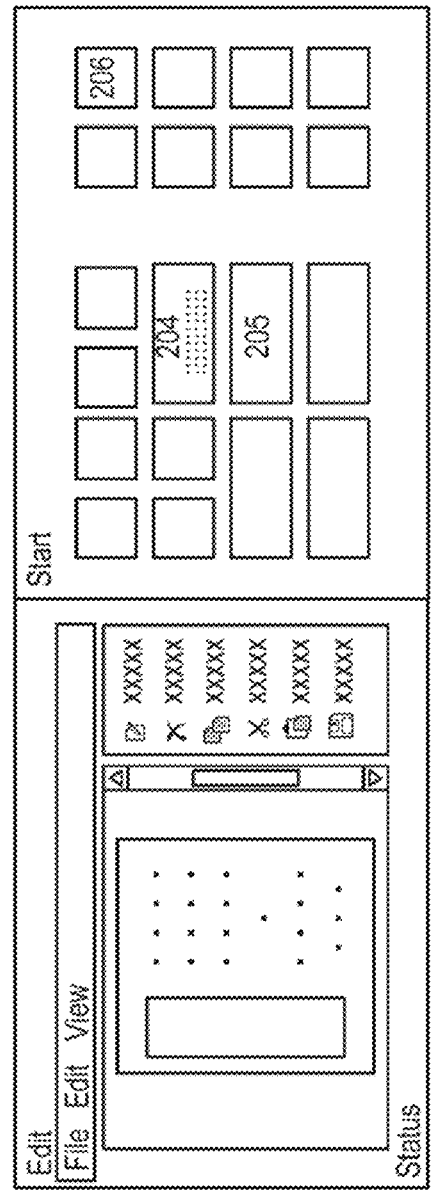
F I G. 10F

INFORMATION PROCESSING APPARATUS, SCREEN DISPLAY METHOD, AND NON-TRANSITORY COMPUTER-READABLE MEDIUM

BACKGROUND OF THE INVENTION

1. Field of the Invention

The present invention relates to an information processing apparatus, screen display method, and non-transitory computer-readable medium and, more particularly, to a display method of a plurality of screens in a plurality of application execution environments.

2. Description of the Related Art

In recent years, computer operation environments grow in diversity. Information inputs using a keyboard and mouse, which are conventionally used, are available, while computers which adopt information inputs by unit of touch operations using human fingers using capacitance type touch panels are also increasing. For example, Windows8® as an OS (Operating System) available from Microsoft® Corporation, U.S.A. allows a single computer to implement these operation environments having different aspects.

On the other hand, an operation environment which is suited to be basically used by a mouse and keyboard by simultaneously displaying a plurality of windows on a single display is available. In Windows8®, this operation environment is called "Desktop environment". Furthermore, an application which runs on the Desktop environment is called a Desktop application. Also, an operation environment which is suited to be used by a touch operation of a human finger by displaying operation buttons and the like used to receive operations in a large size, and allowing one application to basically occupy one display is available. In Windows8®, this operation environment is called "Metro environment". Furthermore, an application which runs on the Metro environment is called a Metro application.

Then, with the advent of the Metro environment, a new operation method is adopted as an application running method. Conventionally, a menu called a start menu is displayed on a part of a display, and a menu item of corresponding one of various applications is selected to run that application. In Windows8®, a dedicated screen (Metro tile screen) used to run an application is fully displayed on one display, and each application is registered as a shortcut called a tile required to run an application. On each tile, an application can notify the user of information (for example, surrounding weather information, a printer status, and the like).

On the other hand, a plurality of displays can be connected to a single computer. An application which runs on the conventional Desktop environment can display a window at an arbitrary position on one of the plurality of displays. Also, by holding the previous closed position of the window, the application which runs on the conventional Desktop environment displays the window at the same position as the closed position when it displays the window for the next time. Furthermore, the application sets on which of the plurality of displays it displays the window, and displays the window according to that setting. The aforementioned control can enhance visibility to improve the user's operation efficiency (for example, see Japanese Patent Laid-Open No. 2004-86586).

However, when an environment based on the premise that one display is occupied like the Metro environment is included upon displaying a window by running a Desktop application, the visibility cannot be enhanced by only displaying the window at the previous closed position or designated position. Especially, when a plurality of displays are connected to a computer, unwanted or unexpected screen switching occurs, thus lowering user's operability.

For example, when a Desktop application is to run from the Metro tile screen, a display which displays the Metro tile screen is switched to display the Desktop screen, thus displaying a window of the Desktop application. Furthermore, when another Desktop application is to run, the user has to re-display the Metro tile screen and to make a running operation of that Desktop application, resulting in troublesome operations.

The same problem occurs when a Metro application and Desktop application are used together. For example, when the user runs a cooperating Desktop application from a Metro application, a display which displays the Metro application is switched to display the Desktop screen. In order to simultaneously display and use both the Metro application and Desktop application, the user moves a window of the Desktop application which has already run in advance onto a display which is different from a display which displays the Metro application. Then, the user has to re-display the Metro application, resulting in troublesome operations.

SUMMARY OF THE INVENTION

According to an aspect of the present invention, there is provided an information processing apparatus, which comprises an operating system having a first execution environment and a second execution environment, and executes a first application which runs on the first execution environment, and a second application which runs on the second execution environment, the apparatus comprising: a receiving unit configured to receive, when a screen of a first display style on a screen corresponding to the first execution environment is displayed on a display, a running instruction of the second application to be displayed in a second display style; a determination unit configured to determine whether or not the information processing apparatus comprises a plurality of displays; and a display unit configured to display, when the information processing apparatus comprises the plurality of displays, without changing a display style of a screen displayed on a display in the first display style, a screen of the second application on another display in the second display style.

According to the present invention, when a plurality of displays are connected, the user need not switch an operation environment even under an OS including an operation environment which occupies one display, thus allowing to easily cooperate a plurality of operation environments.

Further features of the present invention will become apparent from the following description of exemplary embodiments (with reference to the attached drawings).

BRIEF DESCRIPTION OF THE DRAWINGS

FIG. 4 is a view showing an example of a UI of an initial screen for a second environment;

FIGS. 8A and 8B are flowcharts upon running a Desktop application according to the first embodiment;

FIG. 9 is a view showing an example of a UI of a Metro related application; and

FIGS. 10A, 10B, 10C, 10D, 10E, and 10F are views showing contents of displays, which are displayed upon running a Desktop application.

DESCRIPTION OF THE EMBODIMENTS

First Embodiment

An embodiment required to carry out the present invention will be described hereinafter with reference to the drawings. Note that the following embodiment does not limit the present invention according to the scope of the claims, and all of combinations of features described in the embodiment are not always indispensable to solving unit of the present invention.

[Hardware Arrangement]

Figure 1:
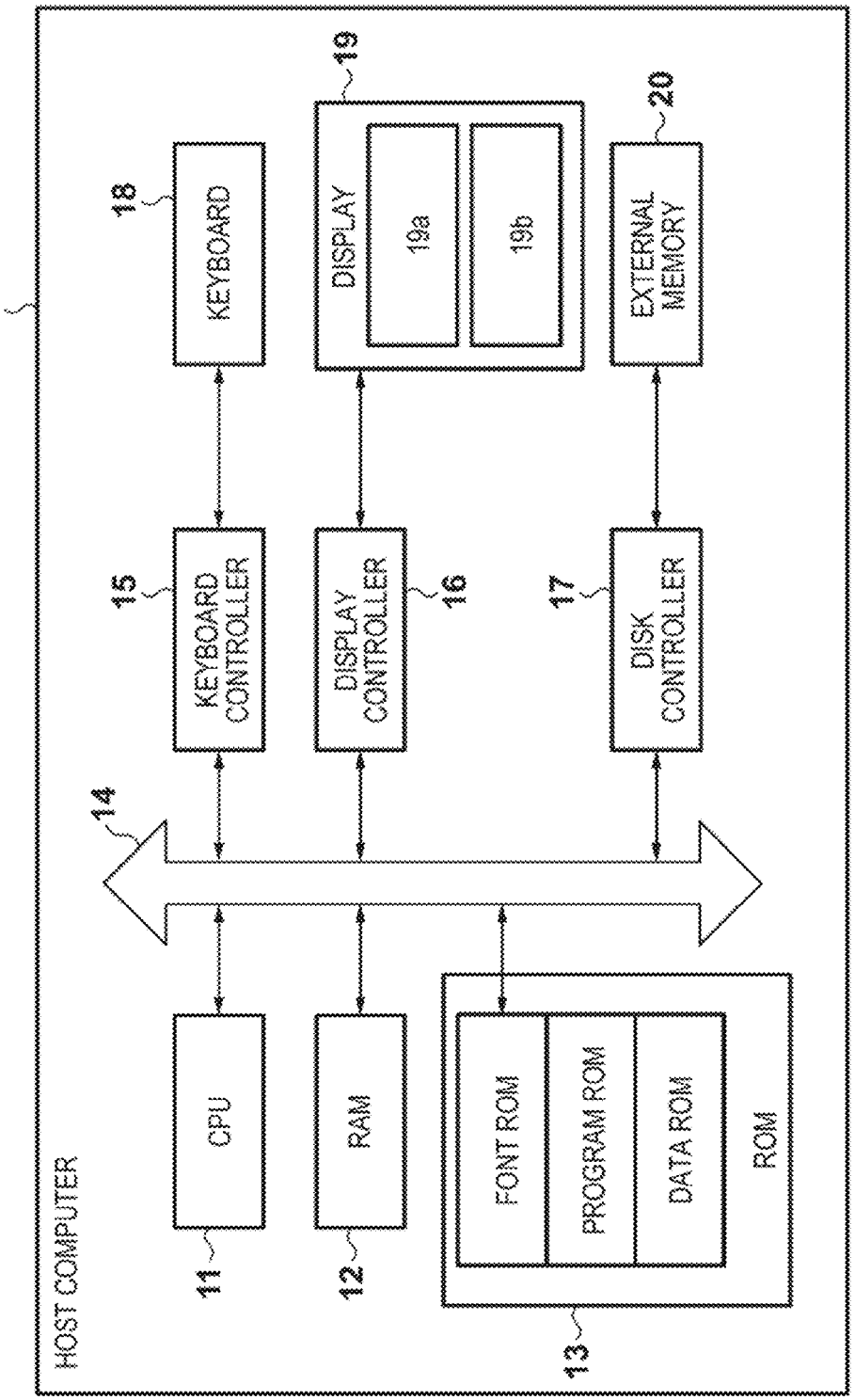
FIG. 1 is a block diagram showing an example of the hardware arrangement of a host computer.

FIG. 1 is a block diagram showing an example of the hardware arrangement of an information processing apparatus of this embodiment. A host computer 1 as the information processing apparatus includes a CPU (Central Processing Unit) 11, RAM (Random Access Memory) 12, ROM (Read Only Memory) 13, system bus 14, and keyboard controller 15. Furthermore, the host computer 1 includes a display controller 16, disk controller 17, keyboard 18, display 19, and external memory 20.

The CPU 11 controls execution of display processing, edit processing, and the like based on processing programs stored in a program ROM included in the ROM 13 or the external memory 20. Also, the CPU 11 executes an OS (Operating System), and executes device drivers given for respective devices. The CPU 11 controls respective devices connected to a system bus 14. The RAM 12 functions as a main memory, work area, and the like of the CPU 11. For example, Windows8® or the like is available as the OS, and a printer driver is available as a driver.

The ROM 13 includes the program ROM, a font ROM, and a data ROM. The program ROM in the ROM 13 or the external memory 20 stores OS programs and the like as control programs of the CPU 11. The font ROM in the ROM 13 or the external memory 20 stores document files, font data, and the like used in document processing. Furthermore, the data ROM in the ROM 13 or the external memory 20 stores various data used upon execution of the document processing or the like. To the system bus 14, the CPU 11, RAM 12, ROM 13, keyboard controller 15, display controller 16, and disk controller 17 are connected.

The keyboard controller 15 controls key inputs from the keyboard 18 and a pointing device (not shown). The display controller 16 controls display on the display 19. Assume that in this embodiment, the display 19 includes a plurality of displays such as displays 19a and 19b. The disk controller 17 controls accesses to the external memory 20. As the external memory 20, for example, a hard disk and Floppy® disk are used, and store a boot program, various applications, font data, user files, document files, a printer control command generation program, and the like. Note that the CPU 11 displays user interfaces (UIs) such as various windows, which are registered in advance, based on commands instructed by a mouse cursor (not shown) or the like on the display 19, and executes various kinds of data processing. The user can run an application, and can display a UI related to that application.

[Software Configuration]

Figure 2:
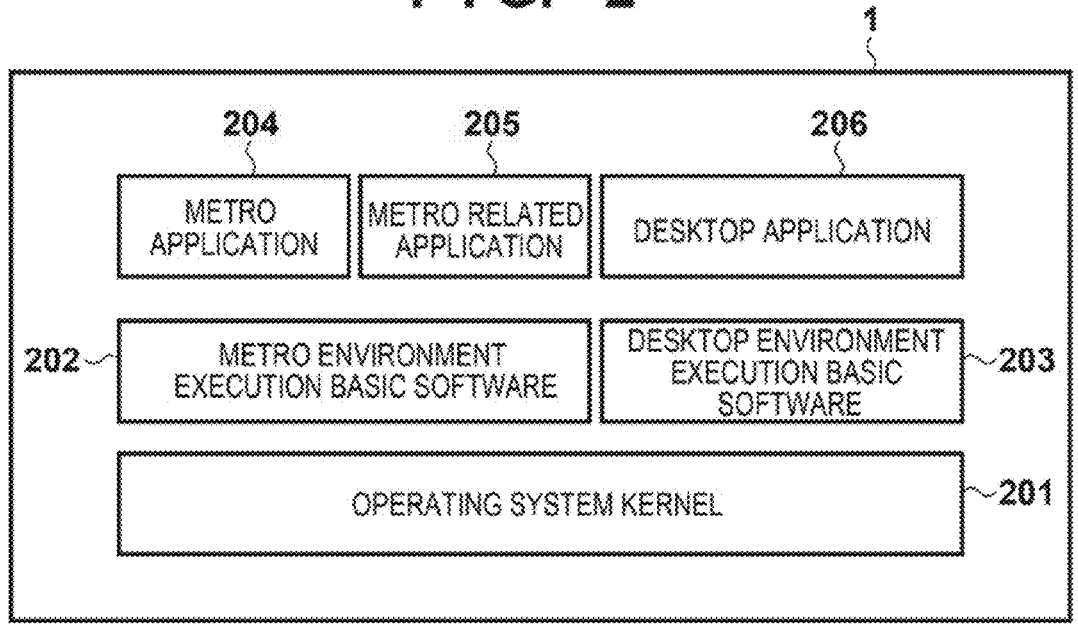
FIG. 2 is a block diagram showing an example of the software configuration of the host computer.

FIG. 2 shows an example of the software configuration required to execute processes of this embodiment. Respective modules are stored as files saved in the external memory 20 shown in FIG. 1. These modules are implemented when another module which uses a module of interest loads that module from the ROM 13 onto the RAM 12 and the CPU 11 executes the loaded module.

The OS includes a kernel 201 as a basis. Then, on the kernel 201, basic software of an application execution environment, which serves as a first execution environment (to be referred to as a Metro environment hereinafter), (to be referred to as Metro environment execution basic software 202 hereinafter) exists. Also, execution basic software of an application execution environment, which serves as a second execution environment (to be referred to as a Desktop environment hereinafter), (to be referred to as Desktop environment execution basic software 203 hereinafter) exists parallel to the Metro environment execution basic software 202.

The Metro environment is mainly configured under the assumption of a touch panel of a mobile device such as a mobile phone or a tablet. The Metro environment execution basic software and Desktop environment execution basic software respectively correspond to, for example, WinRT and Win32 in case of the Windows8® OS. For this reason, the Metro environment execution basic software 202 includes basic functions required for an application which runs on the touch panel (for example, a function of displaying a UI of a display style which is suited to use by touch operations and occupies a full screen). The Metro environment execution basic software 202 does not hold any function of displaying a plurality of windows on a single display, which function is included in the Desktop environment execution basic software 203 (to be described later). Furthermore, the Metro environment execution basic software 202 provides an API (Application Program Interface) as an interface with the OS to an application for the first environment (to be referred to as a Metro application hereinafter).

On the other hand, the Desktop environment is configured under the assumption of the conventional computer screen. For this reason, the Desktop environment execution basic software 203 includes a function required for an application which runs on the conventional computer screen (for example, a function of displaying a window of a display style which is suited to operations using a mouse and keyboard, and allows to freely change a size). Furthermore, the Desktop environment execution basic software 203 provides an API as an interface with the OS to an application for the second environment (to be referred to as a Desktop application hereinafter).

On the respective execution basic software modules, a Metro application 204, Metro related application 205, and Desktop application 206 can be respectively executed. Each application of this embodiment is that which exchanges information with the kernel 201 of the OS via the Metro or Desktop execution basic software.

Note that in the present specification, the Metro application and Metro related application will also be described as first applications, and the Desktop application will also be described as a second application. A display style in the Metro environment will also be described as a first display style, and that in the Desktop environment will also be described as a second display style. When the expressions "first display style" and "second display style" are used, respective execution environments need not always be the Metro environment and Desktop environment. The present invention is applicable to other execution environments as the first and second execution environments.

Note that each application has a state indicating whether or not it is running. Furthermore, the running state of the Metro application is further classified into two states. The first state is "Active", and this state is set when arbitrary processing in the application is in progress. When the Metro application is actually displayed on the display, it is "Active". The second state is "Suspend". In this state, the application neither runs nor is displayed on the display. In general, the Metro application which is not displayed on the display transits to the "Suspend" state after processing required for transition to the "Suspend" state (for example, processing for saving data which is being edited). These states can be detected by acquiring information via the kernel 201 or each execution basic software.

Also, the Metro application 204 according to this embodiment is an arbitrary application, but it is, for example, an application which notifies and confirms weather information in real time. The Metro application may be an application having another function. The Metro related application 205 is, for example, a document processing program, which has, for example, a function of displaying and browsing a list of document data. Furthermore, the Metro related application 205 has a function of editing document data in cooperation with the Desktop application 206. The Metro related application 205 may be other applications or may include other functions.

The Desktop application 206 has, for example, a function of inserting and editing an object into document data which can be displayed as a list by the Metro related application 205. The Desktop application 206 is not limited to that which has this function, and may be other applications, but it an application having a function related to the Metro related application 205. On the other hand, the Metro application 204 and Desktop application 206 do not have any functional relation. Note that the running state of the Metro related application is also classified to either the "Active" or "Suspend" state.

Note that "kernel" is a core of the hierarchically designed OS, and manages exchanges of various resources (hardware and software components) of the computer. Especially, the kernel assumes a role of abstracting hardware components such as the CPU, memory, and I/O devices, and providing an interface that allows hardware and software to exchange information.

Note that this embodiment describes the example in which two execution environments exist on a single computer, as shown in FIG. 2. However, this embodiment is similarly applicable to a case in which there are a plurality of (three or more) execution environments.

[Display Setting Example]

Figure 3A:
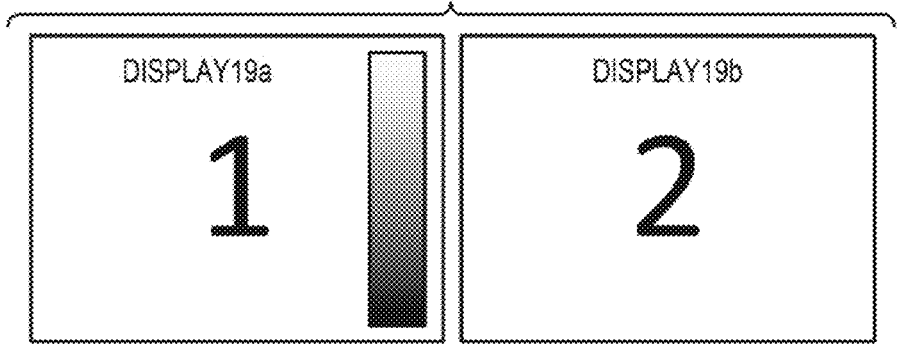
FIGS. 3A and 3B are views showing combinations of displays based on OS settings.
Figure 3B:
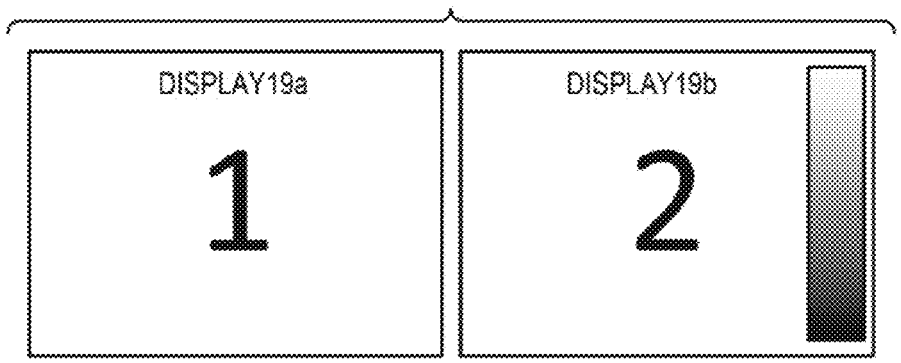

FIGS. 3A and 3B show combinations based on OS settings in association with the display 19 according to this embodiment. This embodiment describes the configuration example of the display including two displays 19a and 19b (first and second displays). However, this embodiment is similarly applicable to a case in which the display includes three or more displays.

Display settings according to this embodiment includes that indicating whether or not a display is a primary display and that indicating whether or not a display is a Metro environment display. "Primary display" is that which displays a window of the Desktop application first. The OS specifies that when display coordinate values of a window are not designated on the application side, the window is displayed on the primary display. Note that the Desktop application can display a window on a display different from the primary display by designating coordinate values.

"Metro environment display" is that which displays a UI of the Metro application and Metro tile screen. In FIG. 3A, the display 19a is set as the primary display and Metro environment display. In FIG. 3B, the display 19a is set as the primary display, and the display 19b is set as the Metro environment display. This embodiment can be practiced even when a single display is used as both the primary display and Metro environment display, as shown in FIG. 3A, or when the primary display and Metro environment display are different, as shown in FIG. 3B. Details will be described later with reference to FIGS. 10A to 10F.

Note that this embodiment can be practiced when the OS setting about the display is the primary display and that display is configured to also serve as the Metro environment display.

[Metro Tile Screen]

FIG. 4 shows a display example of a Metro tile screen 401. FIG. 4 shows a state in which shortcuts used to run the Metro application 204, Metro related application 205, and Desktop application 206 are respectively registered as tiles on the Metro tile screen 401. The Metro tile screen 401 is an entry screen (initial screen) used to issue an instruction to run the Metro application, and is provided by Windows8®. The Metro tile screen 401 is displayed while fully occupying the Metro environment display shown in FIGS. 3A and 3B. A tile 402 is required to run the Metro application 204, and when the user makes a clicking or touch operation on the tile 402, the Metro application 204 runs. Then, the Metro environment display displays a UI of the Metro application 204 shown in FIG. 5 in place of the Metro tile screen 401.

A tile 403 is required to run the Metro related application 205, and when the user makes a clicking or touch operation on the tile 403, the Metro related application 205 runs. Then, the Metro environment display displays a UI of the Metro related application 205 shown in FIG. 6 in place of the Metro tile screen 401.

Figure 7:
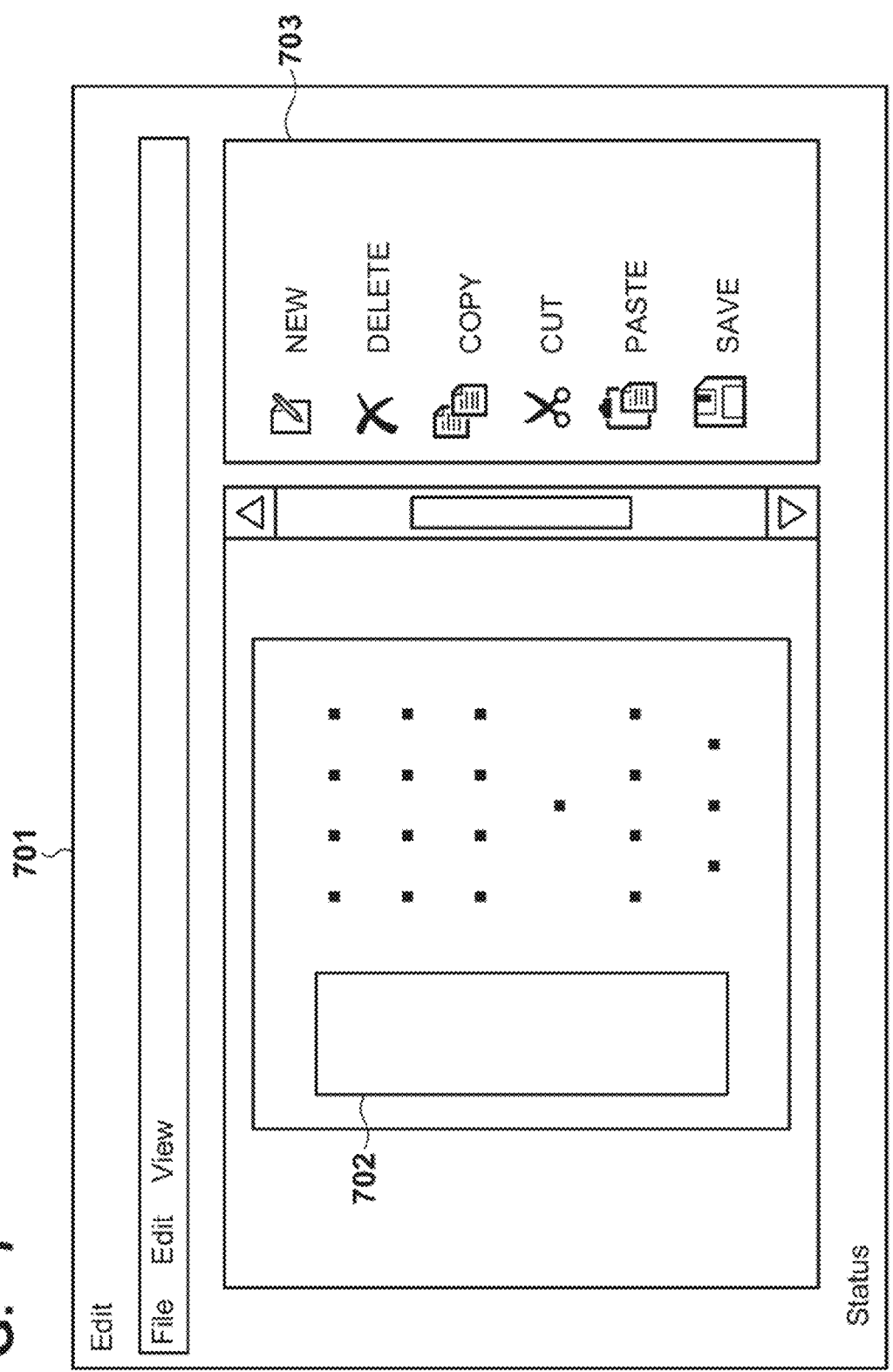
FIG. 7 is a view showing an example of a UI of a Desktop application.

A tile 404 is required to run the Desktop application 206, and when the user makes a clicking or touch operation on the tile 404, the Desktop application 206 runs. Then, a window of the Desktop application 206 is displayed, as shown in FIG. 7. Note that the display position of the window in this case, and details of display processing on respective displays will be described later with reference to FIGS. 8A and 8B.

The Metro application 204 delivers notification information 405 to be notified to the user on the tile in real time. The use purpose of the notification information is not particularly limited (for example, surrounding weather information may be notified). That is, when the tile itself is not displayed on the Metro tile screen 401, this indicates that the user cannot be notified of information displayed on the tile. This poses another problem when the Metro tile screen is not displayed when the screens are switched, as described above.

Figure 5:
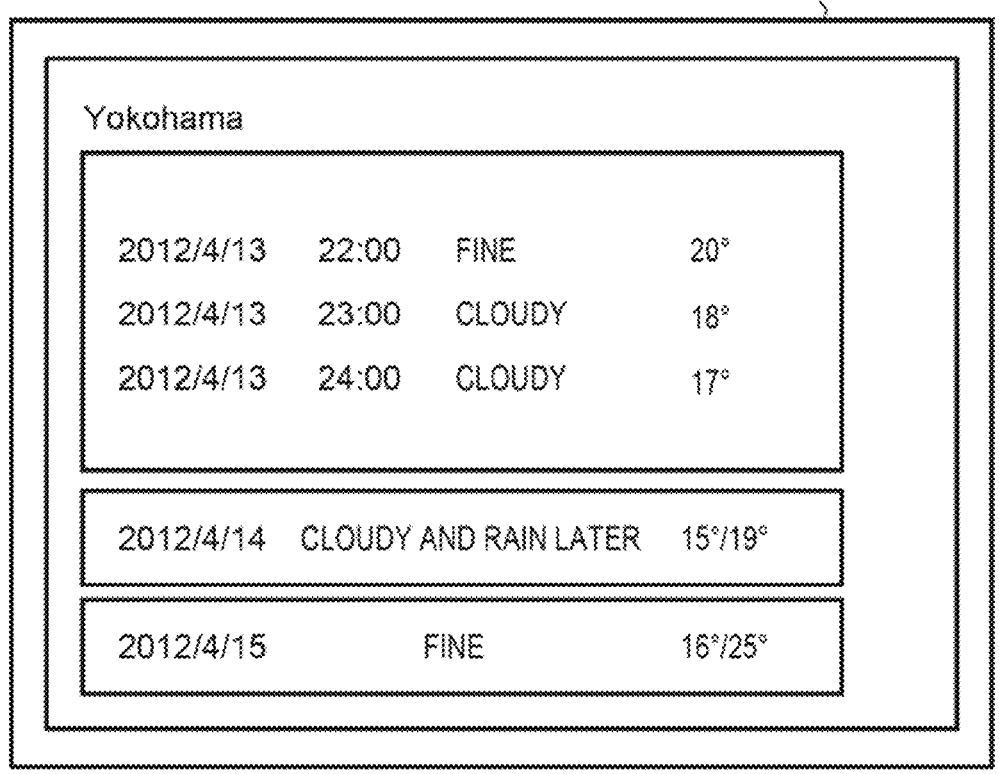
FIG. 5 is a view showing an example of a UI of a Metro application.

FIG. 5 shows an example of the UI of the Metro application 204. A UI 501 is displayed on the Metro environment display while occupying the entire display. Note that the display content shown in FIG. 5 is an example, and the present invention is not limited to this.

Figure 6:
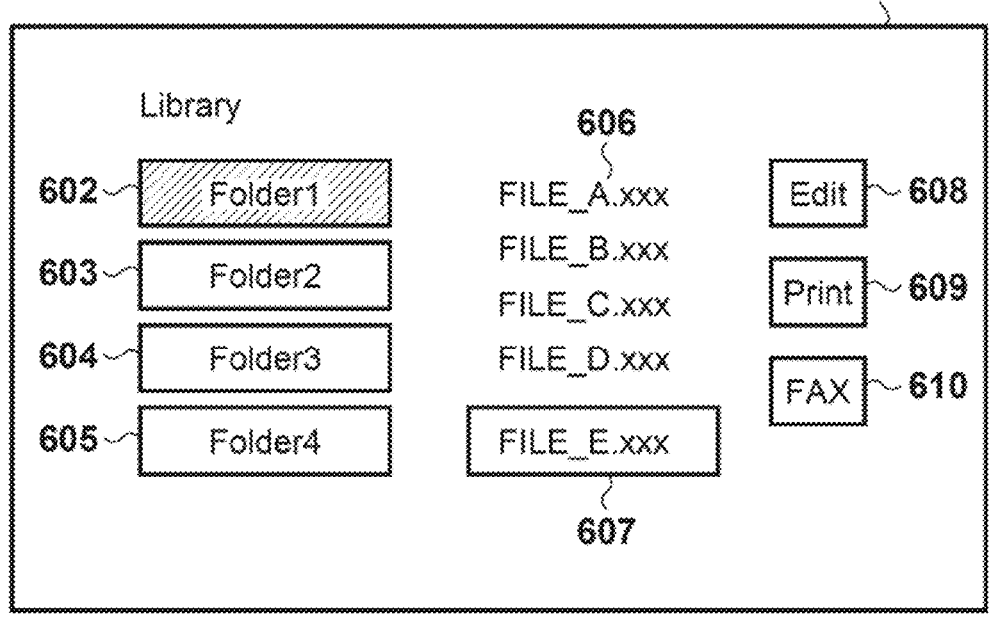
FIG. 6 is a view showing an example of a UI of a Metro related application.

FIG. 6 shows an example of the UI of the Metro related application 205. A page 601 indicates the overall UI of the Metro related application 205, and is displayed while occupying the entire display. Folders 602, 603, 604, and 605 indicate a list of folders accessible by the Metro related application 205. Of these folders, the folder 602 is currently selected by the user. Then, a file list 606 displays a list of files included in the folder (in this case, the folder 602) selected by the user.

A selected file 607 is currently selected as a target of various file operations. Buttons 608, 609, and 610 are controls required to execute processes for the selected file 607. For example, the button 608 is required to run the Desktop application 206 which is used to edit the selected file 607. The button 609 is required to print the selected file 607. The button 610 is required to FAX-send the selected file 607. Of course, the present invention is not limited to these specific buttons, and buttons corresponding other functions may be provided.

FIG. 7 shows an example of the UI of the Desktop application 206. A window 701 is a main window of the Desktop application 206. A display size and display position (coordinates) of the window 701 of the Desktop application 206 can be changed according to, for example, a user instruction.

A page 702 displays a page of a document file to be edited by the Desktop application 206. The page of the document file includes an object, which can be selected by the user. Controls 703 are required to execute functions held by the Desktop application 206. The object can be processed with respect to the page 702. For example, a new object can be added or the object can be deleted. Note that the present invention is not limited to the aforementioned functions, and the Desktop application 206 may have other functions.

[Processing at Running Timing of Desktop Application]

Figure 8A:
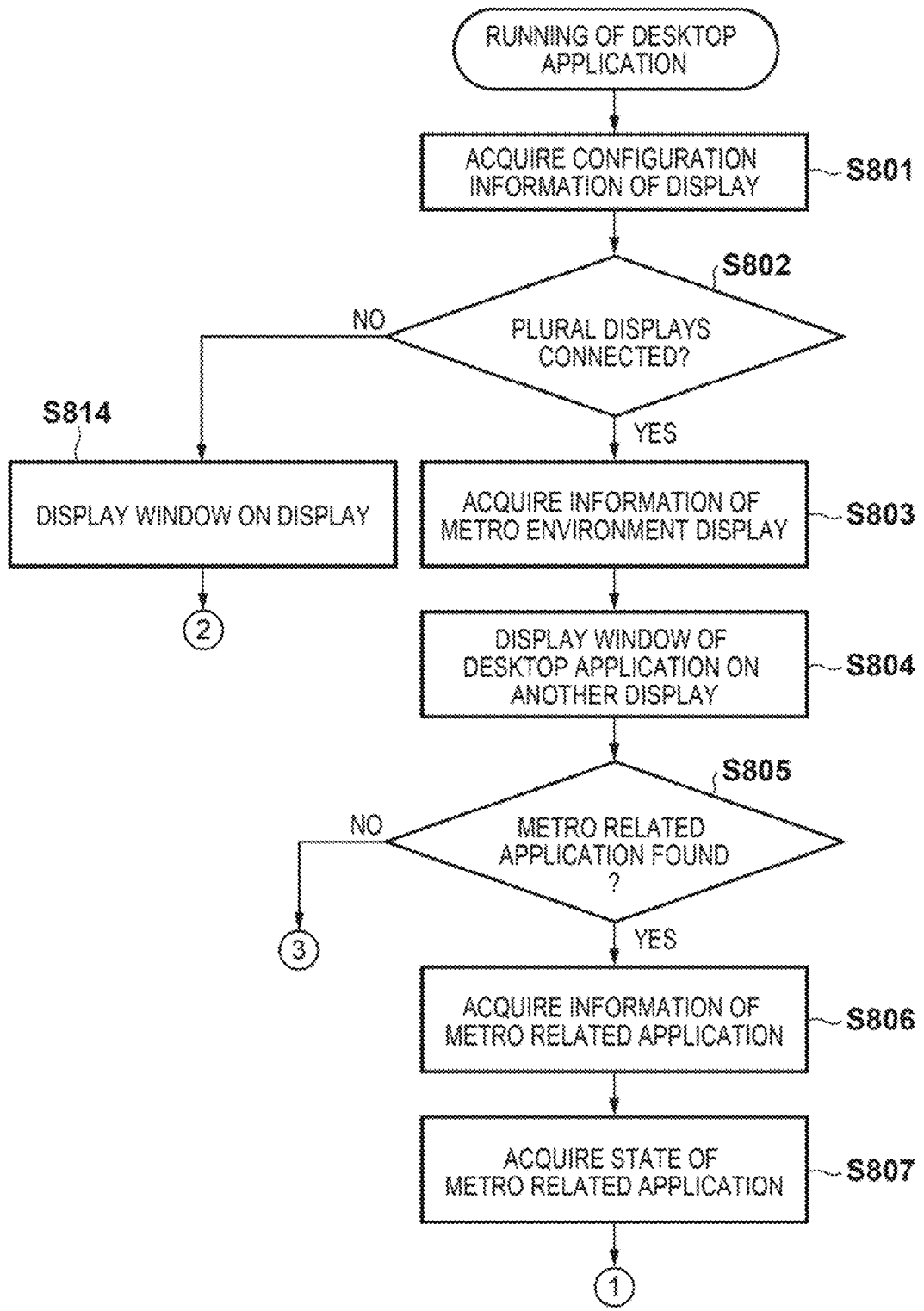

The processing sequence at the running timing of the Desktop application 206 according to this embodiment will be described below with reference to FIGS. 8A to 10F. FIGS. 8A and 8B are flowcharts of running processing of the Desktop application 206. This processing sequence can be implemented, for example, when the CPU 11 reads out a program stored in the program ROM in the ROM 13 as a storage unit onto the RAM 12 and executes the readout program.

When the user makes a clicking or touch operation on the tile 403 in FIG. 4 or the button 608 in FIG. 6, the running processing of the Desktop application 206 is started. When an icon of the Desktop application 206 is registered as a shortcut on the conventional Desktop screen, and the user clicks that icon, the running processing of the Desktop application 206 is also started. The tile, shortcut, or the like implements a running instruction receiving unit.

In step S801, the Desktop application 206 acquires configuration information of the display 19 via the Desktop environment execution basic software 203. The configuration information acquired in this step includes the number of displays connected to the host computer 1, and setting information indicating whether the respective displays display extended display areas or copied display areas. When display areas are extended, the plurality of displays can independently display different contents. When a display area is copied and displayed, the same contents are displayed on the plurality of displays. That is, in this embodiment, the plurality of displays are handled as a single display.

The Desktop application 206 determines in step S802 with reference to the acquired configuration information of the display 19 acquired in step S801 whether or not a plurality of displays having different display contents are connected. If the plurality of displays having different display contents are connected (YES in step S802), the process advances to step S803; otherwise (NO in step S802), the process advances to step S814.

In step S803, the Desktop application 206 acquires information of a Metro environment display via the Desktop environment execution basic software 203. In step S804, the Desktop application 206 displays the window 701 as the self UI on a display different from the Metro environment display based on the information acquired in step S803. Note that the display which displays the window 701 is not particularly limited as long as it is different from the Metro environment display. The Desktop application 206 determines in step S805 whether or not there is a Metro related application associated with itself. If there is a Metro related application (YES in step S805), the process advances to step S806; otherwise (NO in step S805), the process advances to step S811.

In step S806, the Desktop application 206 acquires a process name of the Metro related application. Note that as for the Metro related application, a specific application may be registered in advance by a program, or a Metro related application setting dialog shown in FIG. 9 may be displayed, and the Metro related application may be set as needed. For example, when the user selects a radio button 902 in FIG. 9, the Metro related application 205, which is set in advance, is set as the Metro related application of the Desktop application. When the user selects a radio button 903, he or she can set an arbitrary application in an input field 904, and the input application is set as the Metro related application of the Desktop application. When the user uses a browse button 905, he or she can select the Metro related application from files.

In step S807, the Desktop application 206 acquires information associated with a state of the Metro related application based on the process name acquired in step S806. Then, the Desktop application 206 determines in step S808 based on the information acquired in step S807 whether or not the Metro related application is running. If the Metro related application is running (YES in step S808), the process advances to step S809; otherwise (NO in step S808), the process advances to step S811.

The Desktop application 206 determines in step S809 whether the state of the Metro related application is "Active" or "Suspend". If the state of the Metro related application is "Active" (YES in step S809), the process advances to step S810; if it is "Suspend" (NO in step S809), the process advances to step S811. In step S810, the Desktop application 206 displays the UI of the Metro related application on the Metro environment display. More specifically, the Desktop application 206 communicates with the Metro related application, and the Metro related application displays the self UI according to an instruction from the Desktop application. In this case, in case of the application such as the Metro related application 205 which is set in advance, a method of exchanging information by monitoring files stored in a specific folder with each other may be used. Furthermore, when the user designates an arbitrary application, a method of notifying that application via the Desktop environment execution basic software 203 may be used.

In step S811, the Desktop application 206 acquires a list of currently running Metro applications, and determines whether or not an "Active" Metro application is found. If an "Active" Metro application is found (YES in step S811), the process advances to step S812; otherwise (NO in step S811), the process advances to step S813. In step S812, the Desktop application 206 displays the "Active" Metro application on the Metro environment display. If a plurality of "Active" applications are found, the Desktop application 206 may display a latest running Metro application as an "Active" Metro application. Alternatively, the user may allow to set a priority order in advance, and a Metro application may be decided according to this priority order.

In step S813, the Desktop application 206 displays the Metro tile screen 401 on the Metro environment display. For example, the Desktop application 206 can display the Metro tile screen 401 by expressing a key operation by the user via the Desktop environment execution basic software 203.

In step S814, the Desktop application 206 displays a main window. In this case, since only the display having the single display content is connected, no UI associated with the Metro application or Metro related application is displayed. Then, this processing sequence ends.

[Screen Display Example]

FIGS. 10A to 10F show display states of respective displays after the host computer 1 includes a plurality of displays, and runs the Desktop application 206 to which the processing at the running timing of the Desktop application of this embodiment is applied. Assume that the Metro related application 205 is set as a Metro related application.

Figure 10A:
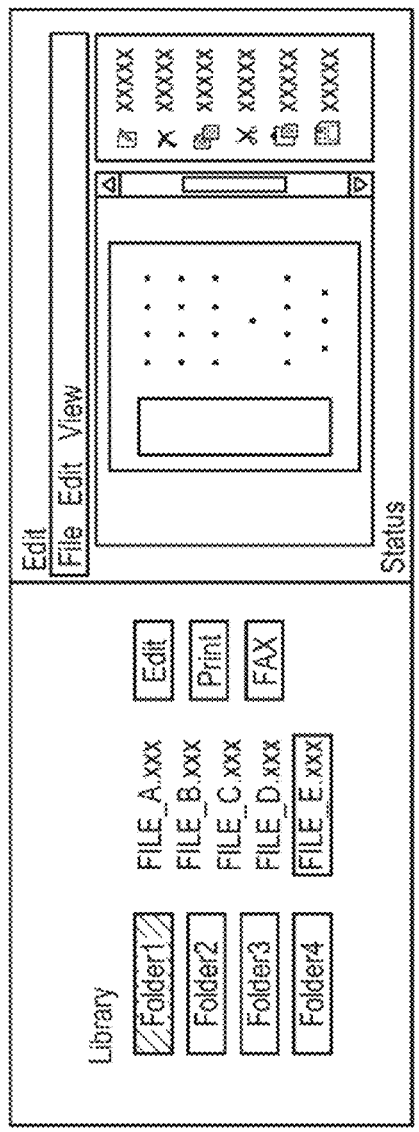
Figure 10B:
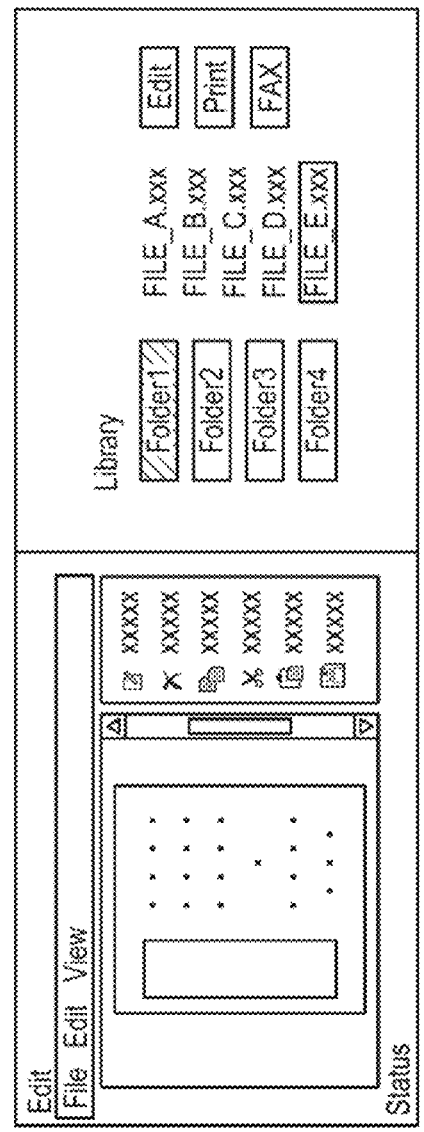
Figure 10C:
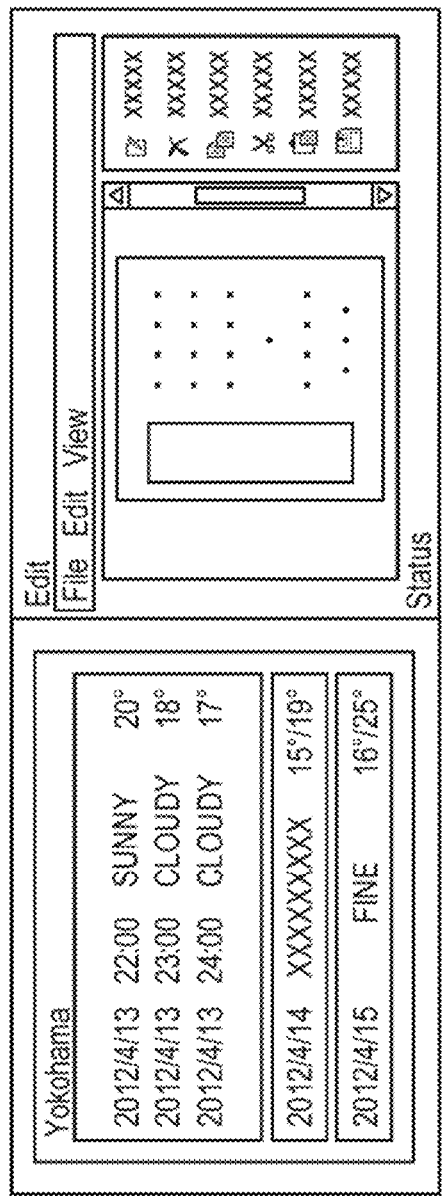

Assume that in FIGS. 10A, 10C, and 10E, the left display is set as the primary display and Metro environment display. On the other hand, assume that in FIGS. 10B, 10D, and 10F, the left display is set as the primary display, and the right display is set as the Metro environment display.

An operation example when the UI of the Metro related application is displayed on the display will be described first with reference to FIGS. 10A and 10B.

Assume that the UI (corresponding to the page 601 in FIG. 6 in this case) of the Metro related application 205 is displayed on the left Metro environment display before the Desktop application runs. That is, the Metro related application 205 is in the "Active" state. When the Desktop application runs in this case, a display state shown in FIG. 10A is set. In FIG. 10A, the left Metro environment display displays the UI of the Metro related application 205 in step S810. Then, the right display which is not the Metro environment display displays the main window (corresponding to the window 701 in FIG. 7 in this case) of the Desktop application 206.

On the other hand, assume that the UI (corresponding to the page 601 in FIG. 6 in this case) of the Metro related application 205 is displayed on the right Metro environment display before the Desktop application runs. That is, the Metro related application 205 is in the "Active" state. When the Desktop application runs in this case, a display state shown in FIG. 10B is set. In FIG. 10B, the right Metro environment display displays the UI of the Metro related application 205 in step S810. Then, the left primary display which is not the Metro environment display displays the main window (corresponding to the window 701 in FIG. 7 in this case) of the Desktop application 206.

When the Metro related application 205 and Desktop application 206 are used together, and when the Desktop application 206 runs from the Metro related application 205, the respective UIs are automatically displayed on the respective displays. For this reason, the user need not switch the display contents of the displays (that is, he or she need not re-display the Metro related application 205 and need not move the window of the Desktop application 206), thus effectively utilizing the plurality of displays.

Even when the primary display and Metro environment display are the same or different, as shown in FIGS. 10A and 10B, this processing sequence is applicable.

An operation example when the UI of the Metro application is displayed on the display will be described below with reference to FIGS. 10C and 10D.

Assume that the left Metro environment display displays the UI (corresponding to the UI 501 in FIG. 5 in this case) of the Metro application 204 before the Desktop application runs. That is, the Metro application 204 is in the "Active" state. When the Desktop application runs in this case, a display state shown in FIG. 10C is set. In FIG. 10C, the left Metro environment display displays the UI of the Metro application 204 in step S812. Then, the right display which is not the Metro environment display displays the main window (corresponding to the window 701 in FIG. 7 in this case) of the Desktop application 206.

On the other hand, assume that the right Metro environment display displays the UI (corresponding to the UI 501 in FIG. 5 in this case) of the Metro application 204 before the Desktop application runs. That is, the Metro application 204 is in the "Active" state. When the Desktop application runs in this case, a display state shown in FIG. 10D is set. In FIG. 10D, the right Metro environment display displays the UI of the Metro application 204 in step S812. Then, the left primary display which is not the Metro environment display displays the main window (corresponding to the window 701 in FIG. 7 in this case) of the Desktop application 206.

When the Desktop application 206 runs from a Desktop icon during use of the Metro application 204, the Metro environment display maintains the current state (a state in which the UI of the Metro application 204 is displayed). Then, the Desktop application 206 automatically displays the window on the display different from the Metro environment display. For this reason, the user need not switch the display contents of the displays (that is, he or she need not re-display the Metro application 204 and need not move the window of the Desktop application 206), thus effectively utilizing the plurality of displays.

Figure 10D:
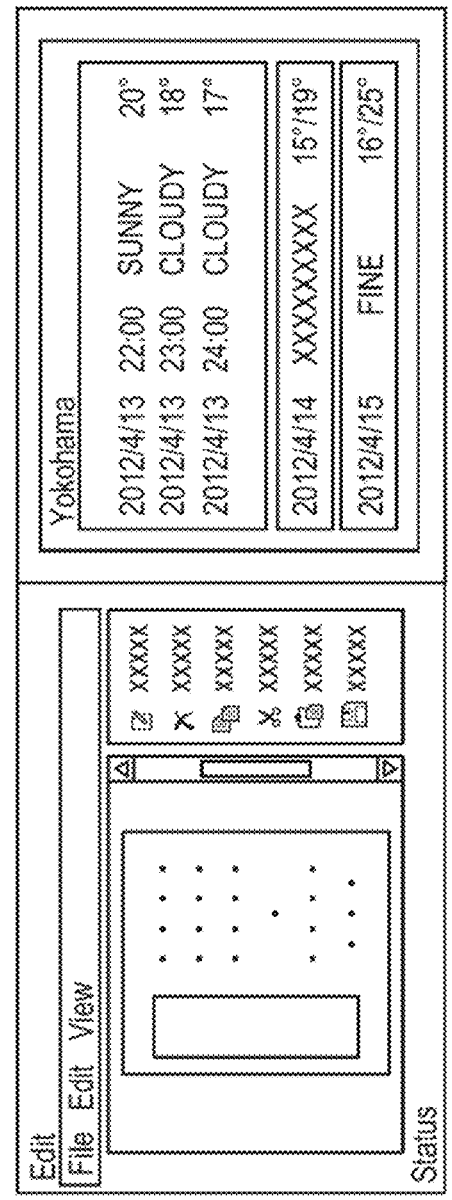

Even when the primary display and Metro environment display are the same or different, as shown in FIGS. 10C and 10D, this processing sequence is applicable.

An operation example when the Metro tile screen 401 is displayed on the display will be described below with reference to FIGS. 10E and 10F.

Assume that the left Metro environment display displays the Metro tile screen 401 before the Desktop application runs. When the Desktop application runs in this case, a display state shown in FIG. 10E is set. In FIG. 10E, the left Metro environment display displays the Metro tile screen 401 in step S813. Then, the right display which is not the Metro environment display displays the main window (corresponding to the window 701 in FIG. 7 in this case) of the Desktop application 206.

On the other hand, assume that the right Metro environment display displays the Metro tile screen 401 before the Desktop application runs. When the Desktop application runs in this case, a display state shown in FIG. 10F is set. In FIG. 10F, the right Metro environment display displays the Metro tile screen 401 in step S813. Then, the left primary display which is not the Metro environment display displays the main window (corresponding to the window 701 in FIG. 7 in this case) of the Desktop application 206.

When the Desktop application 206 runs from the Metro tile screen and is used solely, the Metro environment display maintains the current state (a state in which the Metro tile screen is displayed). Then, the Desktop application 206 automatically displays the window on the display different from the Metro environment display. For this reason, the user need not switch the display contents of the displays (that is, he or she need not re-display the Metro tile screen 401 and need not move the window of the Desktop application 206), thus effectively utilizing the plurality of displays.

Furthermore, when a Desktop application different from the Desktop application 206 is used together, the Metro environment display displays the Metro tile screen 401. Thus, the user need not switch the display contents of the displays when he or she subsequently runs the Desktop application.

Even when the primary display and Metro environment display are the same or different, as shown in FIGS. 10E and 10F, this processing sequence is applicable.

Second Embodiment

In the flowchart of the first embodiment, contents to be displayed on the Metro environment display are uniquely decided according to the presence/absence and state of the Metro related application. However, the user may set to associate respective states and screens to be displayed on displays, and may set their display operations like check boxes 906, 907, and 908 in FIG. 9. For example, by checking the check box 906, and when the Metro related application is not run, a Desktop application 206 runs the Metro related application. Also, by checking the check box 907, even when the Metro related application is in a "Suspend" state, the Metro related application is displayed on the Metro environment display. Furthermore, by checking the check box 908, when no Metro related application is found, a Metro tile screen 401 is displayed on the Metro environment display.

In this manner, since the user is allowed to set contents to be displayed on the Metro environment display according to the state of the Metro related application, a plurality of displays can be efficiently used according to the user's purpose.

Other Embodiments

In the first and second embodiments, the present invention has been described based on Windows8®. However, the present invention can be practiced in an aspect in which one OS includes environments which can provide two different display styles, as shown in FIG. 2. Especially, an aspect like the Metro tile screen can provide the effects of the present invention more efficiently. Also, the number of environments is not limited to two, but the present invention can be practiced even in an aspect in which one OS includes three or more environments or even in a configuration of two or more screens (for example, three screens).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-147597, filed Jun. 29, 2012, which is hereby incorporated by reference herein in its entirety.

What is claimed is:

1. An information processing apparatus, which comprises an operating system having a first execution environment and a second execution environment, and executes a first application which runs on the first execution environment, and a second application which runs on the second execution environment, said apparatus comprising:

a receiving unit configured to receive, when a screen of a first display style on a screen corresponding to the first execution environment is displayed on a display, a running instruction of the second application to be displayed in a second display style;

a determination unit configured to determine whether or not said information processing apparatus comprises a plurality of displays;

a display unit configured to display, when said information processing apparatus comprises the plurality of displays, without changing a display style of a screen displayed on a display in the first display style, a screen of the second application on another display in the second display style; and a detection unit configured to detect a state of the first application to be displayed in the first display style, wherein said detection unit detects a state in which the first application does not run, said display unit displays an initial screen to be displayed in the first display style.

2. The apparatus according to claim 1, wherein when said information processing apparatus comprises a single display, said display unit changes the display style of the display which displays the screen in the first display style, and displays the screen of the second application in the second display style.

3. The apparatus according to claim 1,
wherein when said information processing apparatus comprises the plurality of displays, said display unit switches a display content of the display which displays the screen in the first display style according to the state of the first application detected by said detection unit.

4. The apparatus according to claim 1, wherein the first application and the second application are associated with each other, and
said detection unit detects the state of the first application associated with the second application, which is instructed to run.

5. The apparatus according to claim 1, further comprising a setting unit configured to receive a setting which associates a state to be detected by said detection unit and a screen to be displayed by said display unit according to the state.

6. The apparatus according to claim 1, wherein said detection unit detects a state as to whether or not the first application is running, and whether or not processing is executed when the first application is running.

7. The apparatus according to claim 1, wherein the first display style is a display style which displays one screen which occupies an entire display, and
the second display style is a display style which displays a plurality of screens at arbitrary positions on a display.

8. A screen display method in an information processing apparatus, which comprises an operating system having a first execution environment and a second execution environment, and executes a first application which runs on the first execution environment, and a second application which runs on the second execution environment, the method comprising:

receiving, when a screen of a first display style on a screen corresponding to the first execution environment is displayed on a display, a running instruction of the second application to be displayed in a second display style;

determining whether or not the information processing apparatus comprises a plurality of displays;

displaying, when the information processing apparatus comprises the plurality of displays, a screen of the second application on a display in the second display style without changing a display style of a screen displayed on another display in the first display style; and detecting a state of the first application to be displayed in the first display style, wherein in the detecting step, a state in which the first application does not run is detected, an initial screen to be displayed in the first display style is displayed in the displaying step.

9. A non-transitory computer-readable medium storing a program for controlling a computer, which comprises an operating system having a first execution environment and a second execution environment, and executes a first application which runs on the first execution environment, and a second application which runs on the second execution environment, to function as:

a receiving unit configured to receive, when a screen of a first display style on a screen corresponding to the first execution environment is displayed on a display, a running instruction of the second application to be displayed in a second display style;

a determination unit configured to determine whether or not an information processing apparatus comprises a plurality of displays;

a display unit configured to display, when the information processing apparatus comprises the plurality of displays, a screen of the second application on a display in the second display style without changing a display style of a screen displayed on another display in the first display style; and a detection unit configured to detect a state of the first application to be displayed in the first display style, wherein said detection unit detects a state in which the first application does not run, said display unit displays an initial screen to be displayed in the first display style.

* * * * *